Patented Jan. 27, 1931

1,789,967

UNITED STATES PATENT OFFICE

LLOYD C. DANIELS, OF CRAFTON, AND CHRISTIAN J. SCHWINDT, OF PITTSBURGH, PENNSYLVANIA, ASSIGNORS, BY MESNE ASSIGNMENTS, TO THE SELDEN RESEARCH ENGINEERING CORPORATION, OF PITTSBURGH, PENNSYLVANIA, A CORPORATION OF DELAWARE

COMMINUTED CRYSTALLINE PHTHALIC ANHYDRIDE

No Drawing. Application filed March 22, 1930. Serial No. 438,235.

This invention relates to a phthalic anhydride product and to methods of preparing the same.

In the past phthalic anhydride from the catalytic oxidation of naphthalene has been obtainable in a number of forms. When purified by sublimation, the commercially most attractive process, phthalic anhydride crystallizes into typical long needle crystals, but unfortunately, although possessing most desirable chemical characteristics, the apparent density of the crystals is so low as to greatly increase the cost of containers and they will not pour from the ordinary container such as a barrel. It has been proposed in the past to prepare phthalic anhydride in the form of flakes by melting and passing it through any ordinary type of flaking machine such as, for example, a drum flaker. Flaked phthalic anhydride has a much higher density and can be readily poured from barrels, but has a number of disadvantages. In the first place the flaking operation, which necessitates a preliminary melting, makes easy the accidental inclusion of colored impurities as any colored impurity which is accidentally included, even if only in a small portion of the material, is distributed throughout the whole of the melt and flaked phthalic anhydride therefore frequently is not obtained in a pure white form. In the second place, the flaking operation necessitates melting and processing with some loss in phthalic anhydride, which considerably increases its cost. A further disadvantage of flaked phthalic anhydride lies in the fact that small amount of impurities which impart an odor to the product are readily removed by sublimation, but where flaking is used in connection with distillation methods of purification the product frequently contains sufficient odor-forming constituents to prohibit its use in the formation of certain esters where any odor is objectionable. It has also been proposed to pulverize or grind phthalic anhydride of various forms and the resulting powder, while it has a high apparent density, is an unsatisfactory product because of dusting, which greatly complicates packing and constitutes a very serious fire danger, for phthalic anhydride dust, just as the dust of any other organic compound, can form explosive mixtures with air and tends to take on a high charge of static electricity.

The present invention is based on the surprising discovery that crystalline phthalic anhydride can be comminuted or torn to a powder, without grinding, rapidly and very cheaply and the process is substantially free from dusting. The product resembles a flour which is more or less coarse depending on the length of the comminution process. It is of extraordinary whiteness and high apparent density. It can be poured from a barrel with the same or greater ease than flakes and it dissolves and melts even more rapidly than do the needle crystals. These long needles are apparently disintegrated with utmost ease into a coarse flour and any machine having disintegrating or tearing action can be employed. So easy is the comminution of the needles that even machines which are apparently utterly unsuitable, such as dough-mixing machines with rotary mixing arms can be used with great effect. There is no tendency of the needle crystals to wrap around the arms and the operation is of extraordinary rapidity. In small machines crystals can be transformed into a flour in less than a minute and even in the largest machines the operation proceeds with great rapidity. As there is substantially no formation of fine dust the process does not present a fire hazard and phthalic anhydride can be obtained in a dense, easily pourable, fast melting and dissolving form at a cost but a small fraction of that of flaking and the product is far superior to flaked phthalic anhydride, possessing all of its advantages with none of its disadvantages, and at the same time sharing the advantages of the long needle crystals from which it is prepared. The density is almost double that of the needle crystals. Thus, for example, in the ordinary slack barrel, the standard commercial container for phthalic anhydride, 150 pounds of needle crystals can be packed with ordinary methods, whereas the barrel will accommodate from 200 to 250 pounds of flaked and from 275-280 pounds of comminuted phthalic anhydride flour. The cost of container is quite a considerable item, amounting to nearly a half-cent per pound in the case of needle crystals, as is also the saving in freight where, as is usual, the latter is charged primarily on the basis of volume rather than weight.

The present invention can be carried out in any suitable disintegrator such as, for example, a dough-mixing machine or machines used in the comminution of cellulose fibers and can be carried out either as a batch process in machines which require batch operation or as a continuous process in continuous feed disintegrators. The disintegration when carried out as a batch process may be effected by incorporating a large fraction of the batch at one time, but is preferably effected by feeding the needle crystals in smaller portions as the power required for disintegration rises rapidly with high feed rates.

The invention can be practiced with any suitable disintegrator which does not grind the product so as to produce dust, and the invention is not limited to any particular type of disintegrator, the general types mentioned above being merely illustrative examples of a few common types in which the process can be carried out.

What is claimed as new is:

As a new product, comminuted crystalline phthalic anhydride substantially free from phthalic anhydride dust.

Signed at Pittsburgh, Pennsylvania, this 19th day of March, 1930.

LLOYD C. DANIELS.
CHRISTIAN J. SCHWINDT.